(12) United States Patent
Friggstad

(10) Patent No.: US 7,461,854 B2
(45) Date of Patent: Dec. 9, 2008

(54) STEERING CONNECTION ASSEMBLY

(75) Inventor: Terrance A. Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 422 days.

(21) Appl. No.: 11/273,069

(22) Filed: Nov. 14, 2005

(65) Prior Publication Data

US 2007/0108730 A1    May 17, 2007

(51) Int. Cl.
    *B62D 53/06*    (2006.01)
(52) U.S. Cl. ............... 280/426; 280/459; 280/442; 280/461.1; 280/460.1; 280/444
(58) Field of Classification Search .......... 280/426, 280/459, 442, 461.1, 460.1, 444
See application file for complete search history.

(56) References Cited

U.S. PATENT DOCUMENTS

| | | | |
|---|---|---|---|
| 1,658,203 A | | 2/1928 | Karlsson |
| 2,210,007 A | | 8/1940 | Rodin |
| 2,823,929 A | | 2/1958 | Pasquali |
| 2,974,978 A | | 3/1961 | Isachsen |
| 3,105,704 A | * | 10/1963 | Schramm ............ 280/443 |
| 3,229,986 A | | 1/1966 | Ferris |
| 4,295,659 A | * | 10/1981 | Mergen ............. 280/405.1 |
| 4,382,607 A | | 5/1983 | Voight |
| 5,364,117 A | * | 11/1994 | Keith .............. 280/459 |
| 6,135,484 A | | 10/2000 | Lauronen et al. |

FOREIGN PATENT DOCUMENTS

EP      0 350 008 A2    1/1990

\* cited by examiner

*Primary Examiner*—Paul N Dickson
*Assistant Examiner*—Marlon A Arce Diaz
(74) *Attorney, Agent, or Firm*—Rebecca Henkel

(57) ABSTRACT

A steering connection assembly is provided that interconnects a towed implement with a tow vehicle. The steering connection assembly includes a tongue member having a forward end pivotally connected at the tow vehicle so as to rotate about a first vertical axis, and a rearward end fixed relative to the frame of the agricultural implement. A drive linkage has a forward end pivotally connected at the tow vehicle so as to rotate about a second vertical axis. A steering linkage interconnects the rearward end of the drive linkage to a series of caster wheel assemblies in support of the frame of the implement. In response to a turn of the tow vehicle, the drive linkage communicates a turn signal via rotation about the second vertical axis so as to cause the steering linkage to steer the caster wheel assembly in the turn direction of the tow vehicle.

15 Claims, 3 Drawing Sheets

STEERING CONNECTION ASSEMBLY

FIELD OF THE INVENTION

The invention relates to a steering connection assembly for an agricultural implement towed behind a tow vehicle, and more specifically, relates to a steering connection assembly having a hitch coupling member operable to generate a signal to turn the caster wheel assemblies of the towed agricultural implement in response to a turn by the tow vehicle.

BACKGROUND OF THE INVENTION

A vehicular train employing a series of trailers or implements towed behind a tow vehicle or tow vehicle is often used to even out or distribute heavy loads. In particular to agriculture, a tow vehicle, e.g., tractor, is known to be used to pull a conventional planting or drill implement in tandem with a seed cart for distributing fertilizer and/or seed in a field. The seed cart is typically towed as a separate implement behind the distribution implement because the excessive weight of the seed and/or fertilizer can adversely affect the planting depth, and to avoid obscuring the field of vision of the operator in the tow vehicle. The distribution implement is preferably pulled directly behind the tow vehicle and in front of the seed cart to enhance distribution of the product when turning a corner in the field.

However, the above-described agricultural implement train has drawbacks. With the desire for increased distribution spread, the conventional drill implement includes emerging type wings or booms that each can reach a length of 70 to 80-feet in an extended, operative position. The great weight and extended dimensions of the towed drill implement increases opportunities for undesired jack-knifing of the towed implement such as when decelerating around corners. Also, the towed implements are typically supported by a series of caster wheel assemblies or units. Typically when turning a corner, generally half of these caster wheel assemblies freely caster such that only about half of the weight of the towed implement is contributing to its directional stability. These caster wheel assemblies are known to shimmy or vibrate at high transport speeds and when maneuvering at low lower speeds. This undesired vibration of the caster wheel assemblies increases undesired stress on the frame of the agricultural implement and the tow vehicle. The caster wheel assemblies also require sizable room to fully caster or swivel in a full circle, which can compromise the compact design of an implement and/or cause the point of support of the caster wheel assembly to rotate away from its desired location.

Therefore, there is a need or desire for an enhanced steering connection assembly for a vehicular train that addresses the drawbacks described above. The steering connection assembly should also be configured to be utilized with a wide variety of implements or trailers towed behind a tow vehicle, in addition to those related to agriculture.

SUMMARY OF THE INVENTION

The present invention provides a connection assembly for and a method of steering an agricultural implement being towed by a tow vehicle that meets the desires and needs described above. The steering connection assembly of the present invention thus enhances the smooth maneuverability of the towed agricultural implement, and thereby enhances the operation of the agricultural implement in the field and during transport.

In a first embodiment of the present invention, a steering connection assembly that interconnects a detachable implement towed by a tow vehicle moving a turn angle from a forward direction of travel is provided. The tow vehicle includes a drawbar, and the implement is supported to move on at least one caster wheel assembly. The steering connection assembly includes a tow bar having a forward end opposite a rearward end. The forward end is pivotally connected by a first pin at the drawbar of the tow vehicle so as to rotate about a first vertical axis defined by the first pin. The rearward end is fixedly attached at the frame of the agricultural implement so as to move therewith. The connection assembly further includes a drive linkage having a forward end pivotally connected at the tow vehicle so as to rotate about a second vertical axis spaced from the first vertical axis. A steering linkage interconnects the rearward end of the drive linkage to the at least one caster wheel assembly. In response to the turn of the tow vehicle from the forward direction of travel about the first vertical axis, the drive linkage rotates about the second vertical axis and communicates a turn signal so as to cause the steering linkage to steer the at least one caster wheel assembly in a direction toward the turn angle of the tow vehicle.

The preferred tongue includes an A-frame structure fixed relative to the frame of the agricultural implement. The one embodiment of the steering connection assembly further includes a hitch coupling member interconnecting the drive linkage member to the drawbar of the tow vehicle. The preferred hitch coupling member is keyed to define first and second legs configured to receive the drawbar therebetween. Another embodiment of the hitch coupling member includes a generally vertical aligned plate member perpendicular aligned to a generally horizontal aligned plate member. The vertical aligned member is attached against a lateral side of the drawbar of the tow vehicle relative to the longitudinal axis of the drawbar. The horizontal member includes an opening configured to receive the second pin pivotally coupling the drive linkage to the hitch coupling member, the pin defining the second vertical axis.

The preferred steering linkage is pivotally connected at the frame of the agricultural implement so as to rotate about a third vertical axis. The preferred steering connection assembly further includes a steering arm fixedly attached at the at least one caster wheel assembly so as to rotate or move with rotation of the at least one caster wheel assembly. A steering rod member pivotally interconnects each steering arm to the steering linkage. The steering linkage is generally V- or L-shaped and includes a pair of free ends and a pivot point therebetween. The pivot point of the steering linkage generally defines the third vertical axis. One of the pair of free ends of the steering linkage is pivotally connected to the drive linkage, and the other free end is pivotally connected to the steering rod member.

In another embodiment, the present invention provides an agricultural implement towed by tow vehicle moving a turn angle from a forward direction of travel. The tow vehicle includes a drawbar to be attached at the implement. The implement includes a frame, at least one caster wheel assembly in support of the frame, and a steering connection assembly interconnecting the agricultural implement to the tow vehicle. The steering connection assembly includes a tow bar having a forward end opposite a rearward end. The forward end is pivotally connected at the drawbar of the tow vehicle so as to rotate about a first vertical axis, and the rearward end is fixed at the frame of the implement so as to move therewith. The assembly further includes a drive linkage having a forward end pivotally connected at the tow vehicle so as to rotate about a second vertical axis spaced apart from the first vertical axis. A steering linkage interconnects the rearward end of the drive linkage member to the at least one caster wheel assembly. In response to a turn of the tow vehicle from a forward direction of travel about the first vertical axis, the drive linkage communicates a turn signal to the steering linkage. In response to the signal, the steering linkage steers the at least one caster wheel assembly to turn in a direction of the turn angle of the tow vehicle from the forward direction of travel.

The present invention also provides a method of steering a agricultural implement towed behind a tow vehicle having a draw bar, the agricultural implement having a tow bar pivotally attached at the hitch of the drawbar so as to rotate about a first vertical axis. The method includes the steps of turning the tow vehicle and drawbar a turn angle from a forward direction of travel; turning a hitch linkage fixed with the drawbar from the forward direction of travel; turning a hitch coupling member fixed attached at the drawbar, the coupling member pivotally attached to a drive linkage so as to rotate with respect thereto about a second vertical axis spaced from the first vertical axis; communicating a turn signal via the drive linkage to a caster wheel assembly at the agricultural implement, the turn signal representative of the turn angle of the tow vehicle; and steering the caster wheel assembly at the agricultural implement in a direction of the turn angle of the tow vehicle in response to the turn signal.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
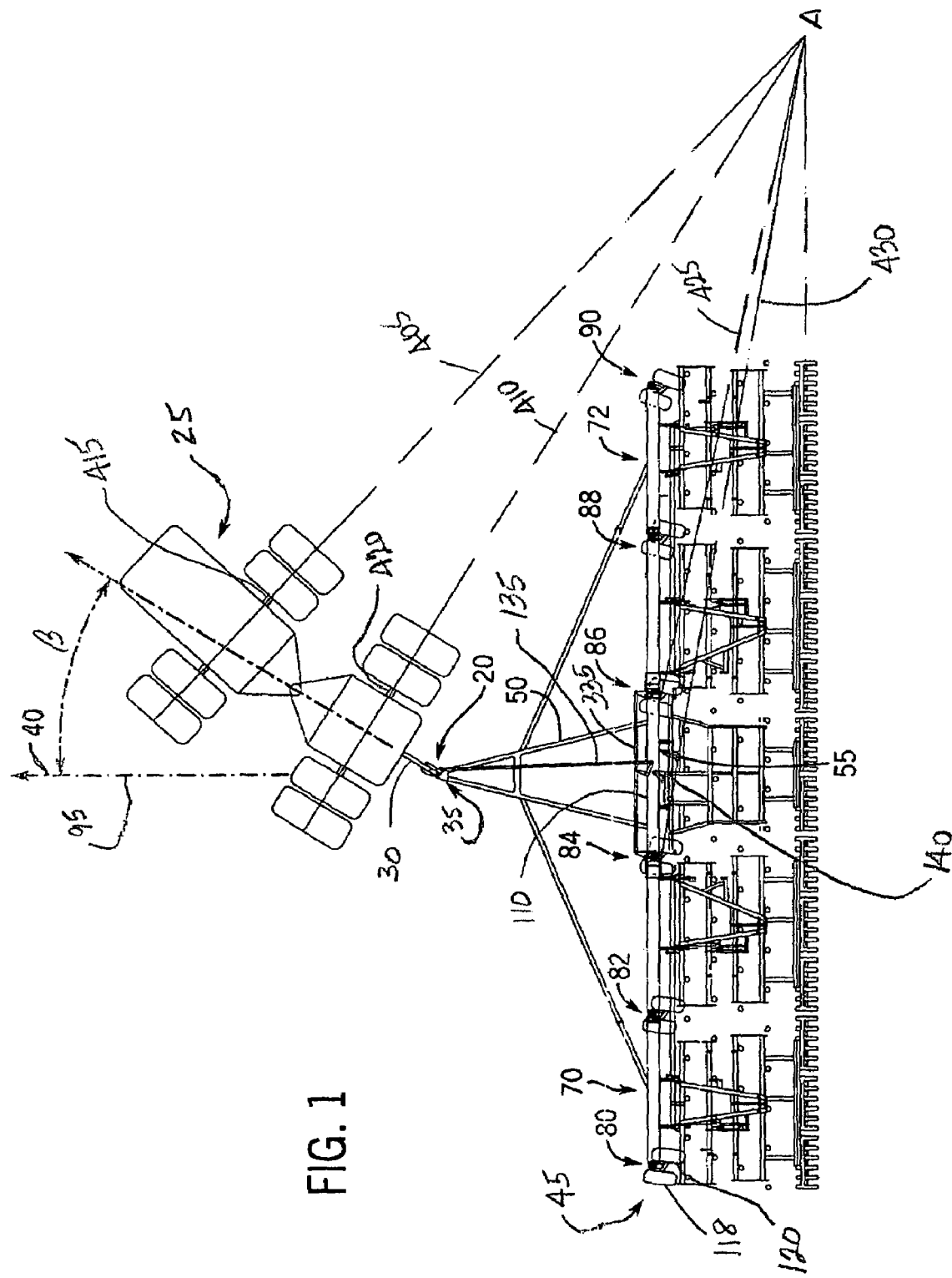
FIG. 1 illustrates a top plan view of a towed implement connected to a tow vehicle by one embodiment of a steering connection assembly in accordance with the present invention.

Referring to FIG. 1, a steering connection assembly 20 is illustrated for interconnecting a towed implement connected to be towed behind a tow vehicle 25 turning an angle (β) from a forward direction of travel 40. The tow vehicle 25 generally includes a draw bar 30 having a coupling pin or coupling pin 35 configured to pivotally interconnect to the towed implement about a vertical axis defined by the coupling pin 35. A preferred towed implement is an agricultural drill or planting implement 45 operable to distribute a supply of product (e.g., seed, fertilizer, pesticide, herbicide, etc.) in a field. Yet, other types of towed implements (e.g., an air cart, a storage trailer, etc) can be connected via the steering connection assembly 20 and is not limiting on the invention.

Still referring to FIG. 1, the drill implement 45 is typically pulled directly by the tow vehicle 25. The preferred drill implement 45 includes a tow bar 50 that includes an A-framed shaped structure and that is fixedly interconnected to a structural frame 55 of the drill implement 45. The forward end of the tow bar 50 is pivotally interconnected about a vertical axis defined by the coupling pin 35 of the drawbar 30 of the tow vehicle 25. The drill implement 45 includes wing sections 70 and 72 pivotally supported on the frame 55 in a known manner to move between an extended, operative position for operation in the field and a folded, inoperative position (not shown) for transport. In the extended, operative position, the wing sections 70 and 72 each typically extend approximately 70-80 feet. In the folded, inoperative position, the wings 70 and 72 are folded back in a rearward direction and positioned generally parallel with the longitudinal 95 of the drill implement 45. The implement 45 may include a hitch (not shown) configured to connect the drill implement 45 to additional towed implements (e.g., pneumatic seed cart) towed in the rear. This is a common configuration of a drive train (i.e., tow vehicle and one or more towed implements) that provides an operator at the tow vehicle 25 with good visibility and the enhanced control over the drill implement 45 when working around obstructions or going into a tight corner.

Figure 2:
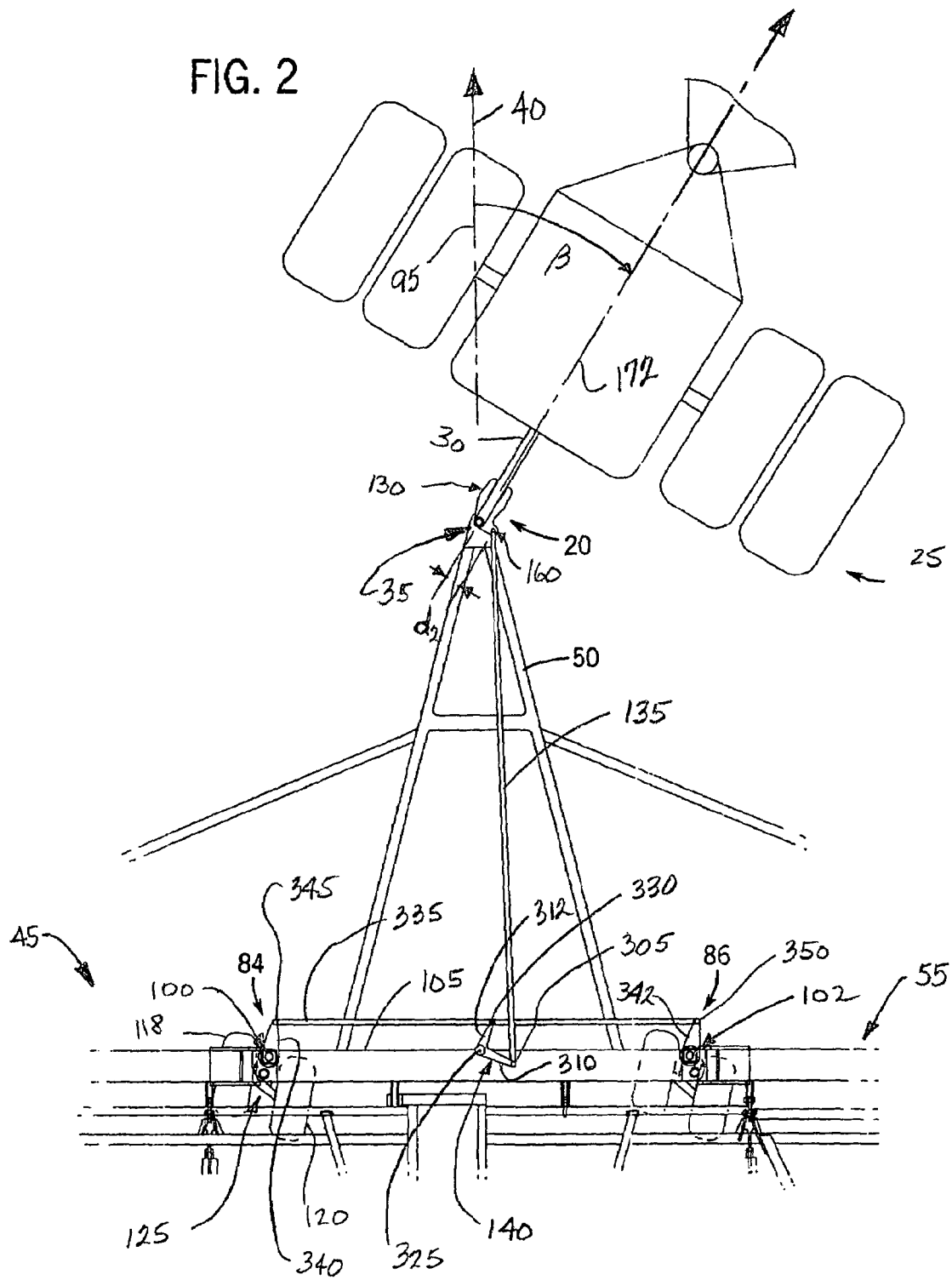
FIG. 2 shows a detailed top plan view of the steering connection assembly shown in FIG. 2.

A series of wheel assemblies 80, 82, 84, 86, 88 and 90 are mounted in moveable support of the frame 55 and wing sections 70 and 72 of the drill implement 45. As shown in FIG. 2, at least the center wheel assemblies 84 and 86 are caster-type wheel assemblies each configured to caster or pivot about a vertical axis defined by a generally vertically aligned steering column or kingpin 100 and 102, respectively, in a known manner. The steering column 100 and 102 of each of the caster wheel assemblies 84 and 86 generally extend downward from a common forward support 105 of the frame 55 generally aligned perpendicular to the longitudinal axis 95 of the drill implement such that the caster wheel assemblies 84 and 86 are commonly aligned in a lateral direction from the longitudinal axis 95.

Referring now to FIG. 2, each caster wheel assembly 84, 86 includes a first tire 118 and a second tire 120 supported in a walking beam arrangement 125 in a manner to provide for leveling of the drill implement 45 as it travels over rough terrain in the field.

Still referring to FIG. 2, the steering connection assembly 20 in accordance with the present invention generally interconnects the tongue or tow bar 50 of the drill implement 45 to the draw bar 30 of the tow vehicle 25 in a manner such that, in response to a turn of the tow vehicle 25 from the forward direction of travel 40 about the first vertical axis defined by the coupling pin 35 at the end of the draw bar 30, the steering connection assembly 20 communicates a turn signal to cause one or both caster wheel assemblies 84, 86 to steer in the turn direction of the tow vehicle 25. The preferred steering connection assembly 20 includes a hitch coupling member 130 interconnected by a drive linkage 135 and a steering linkage 140 to one or both caster wheel assemblies 84, 86.

Figure 3:
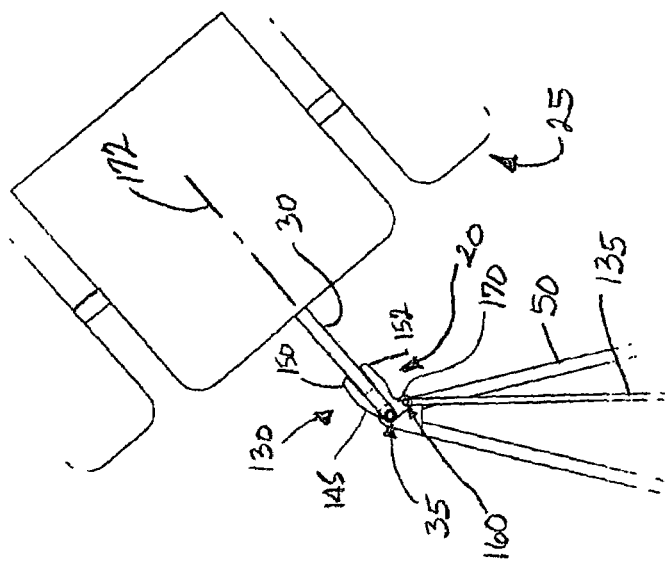
FIG. 3 shows a detailed top plan view of the steering connection assembly shown in FIG. 2.

Referring now to FIGS. 2 and 3, the hitch coupling member 130 is fixedly interconnected to the coupling pin 35 at the draw bar 30 of the tow vehicle 25. As shown in FIG. 3, one embodiment of the hitch coupling member 130 includes a generally horizontally aligned plate member 145 fixedly attached to move with the draw bar 30. A forward end of the plate member 145 includes a generally U-shaped key configuration that defines a first leg 150 and a second leg 152 to receive at least a portion of the draw bar 30 of the tow vehicle 25 therebetween. An opposite rearward end of the hitch coupling member 130 includes a first opening configured to receive a hitch coupling pin 155 therethrough that defines a vertical axis about which the coupling pin 35 of the draw bar 30 as well as the hitch coupling member 130 are pivotally interconnected to the tow bar 50 of the drill implement 45. The opening is located generally aligned with the longitudinal axis 95 of the drill implement 45. The rearward end of the hitch coupling member 130 further includes a second opening laterally offset from the first opening relative to the longitudinal axis 95. The second opening is configured to receive a second coupling pin 160 that defines a vertical axis about which the drive linkage 135 is pivotally interconnected to the hitch coupling member 130. The second opening is shown located through an extended portion 170 of the hitch coupling member 130 that extends laterally outward from the lateral most outward edge of the leg 152 of the hitch coupling member 130 relative to a longitudinal axis 172 of the draw bar 30. Of course, the extended portion 170 and pivotally connected drive linkage 135 can alternatively be located on the opposite side of the hitch coupling member 130.

Figure 4:
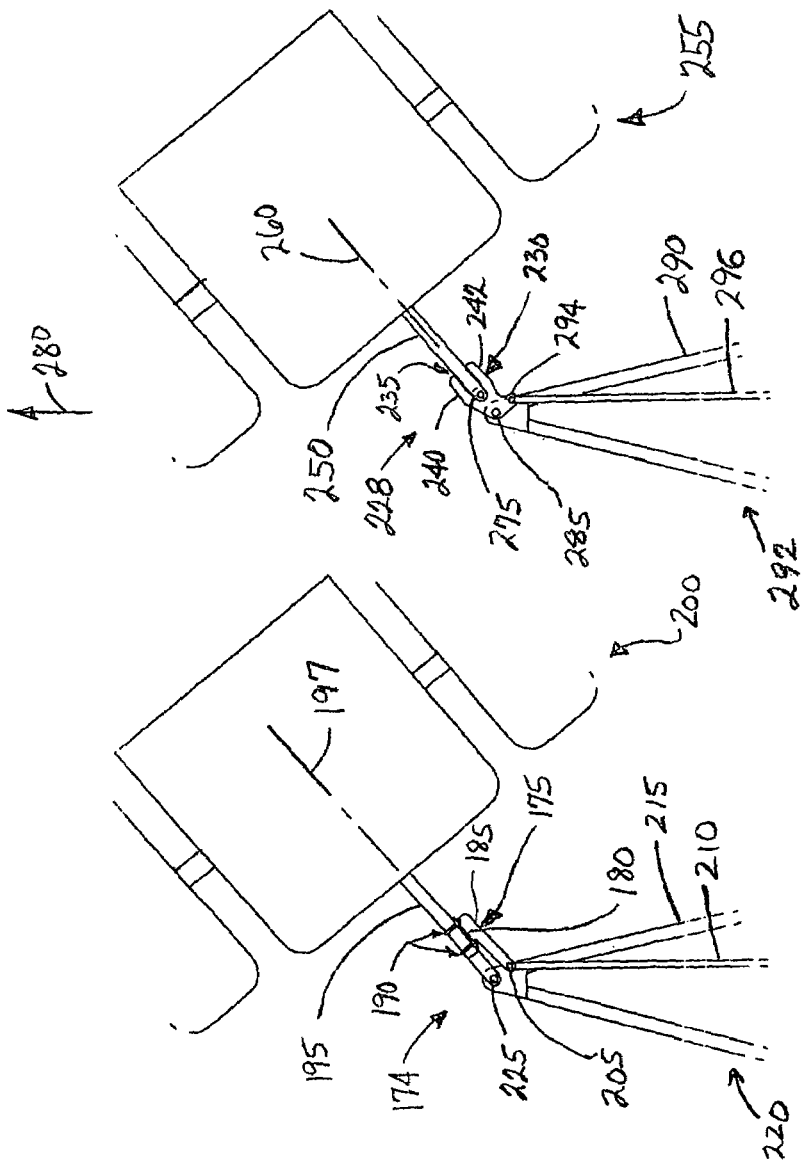
FIG. 4 shows a detailed top plan view of another embodiment of a steering connection assembly in accordance with the present invention.

FIG. 4 shows another embodiment of a steering connection assembly 174 having a hitch coupling member 175. The hitch coupling member 175 includes a generally vertically aligned plate member 180 having a common edge with a horizontally aligned plate member 185. The hitch coupling member 175 is connected by a pair of U-shaped bolts 190 configured to receive a draw bar 195 therethrough so as to fixedly interconnect the vertically aligned plate member 180 against a lateral side of the draw bar 195 of a tow vehicle 200 relative to a longitudinal axis 197. The horizontal plate member 185 includes an opening to receive a coupling pin 205 therethrough that defines a vertical axis about which the hitch coupling member 175 rotates with respect to a drive linkage 210. The drive linkage 210 is pivotally connected so as to be located above a tow bar 215 of the drill implement 220. A coupling pin 225 pivotally interconnects the draw bar 195 of the tow vehicle 200 at the tow bar 215 of the drill implement 220 without passing through the hitch coupling member 175.

Figure 5:
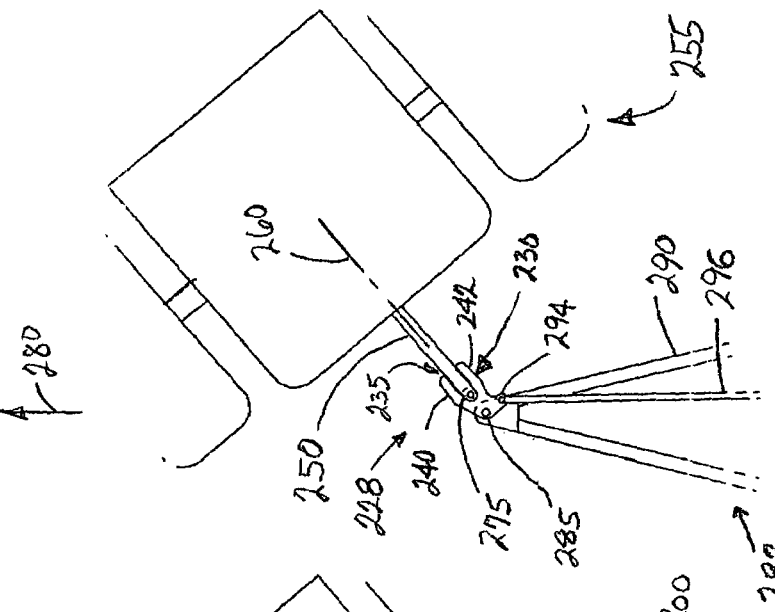
FIG. 5 shows a detailed top plan view of yet another embodiment of a steering connection assembly in accordance with the present invention.

FIG. 5 shows yet another embodiment of a steering connection assembly 228 having a hitch coupling member 230. The hitch coupling member 230 includes a U-shaped key 235 with a pair of legs 240, 242 to receive a draw bar 250 of a tow vehicle 255 therebetween, similar to the hitch coupling member 130 described above. The hitch coupling member 230 further includes an opening located between the first and second legs 240, 242 generally along a longitudinal centerline 260 of the draw bar 250 of the tow vehicle 255. This opening is configured to receive a coupling pin 275 that fixedly interconnects the hitch coupling member 230 at the draw bar 265 such that the hitch coupling member 230 rotates with the draw bar 250 as the tow vehicle 255 turns from a forward direction of travel 280. The hitch coupling member 230 further includes a second opening located rearward from the first opening (relative to forward direction of travel 280) and generally along the longitudinal centerline 260 of the draw bar 250. The second opening is configured to receive a coupling pin 285 therethrough that defines a vertical axis about which the hitch coupling member 230 is pivotally interconnected at a tow bar 290 of a drill implement 292. The hitch coupling member 230 includes a third opening configured to receive a coupling pin 294 that defines a vertical axis about which the hitch coupling member 230 is pivotally interconnected to a steering linkage 296.

Referring back to FIGS. 2 and 3, the drive linkage 135 is generally a linear, elongated member extending from the hitch coupling member 130 to the steering linkage 140 interconnected to the center caster wheel assemblies 84, 86. The forward end of the drive linkage 135 is pivotally interconnected to rotate relative to the hitch coupling member 130 about the vertical axis defined by coupling pin 160. The opposite, rearward end of the drive linkage 135 is interconnected by a coupling pin 305 to the steering linkage 140. The drive linkage 135 is preferably located above the tow bar 50 of the implement 45. However, the drive linkage 135 can alternatively be located below the tow bar 50 and is not limiting on the invention.

The steering linkage 140 is pivotally mounted at the frame 55. The preferred steering linkage 140 is generally L-shaped with a first leg 310 and a second leg 312. The free end of the first leg 310 includes an opening to receive the coupling pin 305 pivotally interconnecting the steering linkage 140 to rotate about a vertical axis relative to the drive linkage 135. An elbow or vertice 320 where the first leg 310 meets the second leg 312 includes an opening configured to receive a coupling pin 325 therethrough that defines a vertical axis about which the steering linkage 140 is pivotally interconnected to the frame 55. The free end of the second leg 312 includes an opening to receive a coupling pin 330 therethrough pivotally interconnecting the steering linkage 140 to rotate about a vertical axis with respect to a steering rod member 335 interconnecting the center caster wheel assemblies 84, 86.

The steering rod member 335 is laterally interconnected so as to cause the center wheel assemblies 84, 86 to turn together in response to a turn signal from the hitch coupling member 130. Referring specifically to FIGS. 2 and 3, steering arms 340 and 342 are rigidly connected to each caster wheel assembly 84, 86, respectively, such that the steering arms 340 and 342 rotate with rotation of each steering column 100, 102 and tires 118, 120, respectively. The first end of the steering rod member 335 includes an opening to receive a coupling pin 345 therethrough that defines a vertical axis about which the steering rod member 335 is pivotally interconnected to the steering arm 340 of the caster wheel assembly 84. The second opposite end of the steering rod member 335 includes an opening configured to receive a coupling pin 350 therethrough that defines a vertical axis about which the steering rod member 335 is pivotally interconnected to the steering arm 342 of the caster wheel assembly 86. An opening is located between the ends of the steering rod member 335 to receive the coupling pin 330 that defines the vertical axis about which the steering rod member 335 is pivotally interconnected to the free end of the leg 312 of the steering linkage 140.

Having described the general structure of the steering connection assembly 20 of the present invention, the following is a general description of the operation of the steering connection assembly 20 between the tow vehicle 25 and the drill implement 45.

FIG. 1 illustrates a top view of the tow vehicle 25 and the drill implement 45 interconnected by the steering connection assembly 20 of the present invention as the tow vehicle 25 corners or turns about a reference point A. Reference lines 405, 410 each illustrate a radius concentric relative to the forward and rearward wheel axes 415 and 420 of the tow vehicle 25 extending through a reference point A. Likewise, reference lines 425, 430 illustrate a radius concentric relative to the axles of the caster wheel assemblies 84 and 86 extending through the reference point A. The radius of cornering of the draw bar 30 about point A is set by the degree of steering or turn angle (β) of the tow vehicle 25 from the forward direction of travel 40. As the draw bar 30 rotates from the forward direction travel 40 with the tow vehicle 25, the tow bar 50 and fixedly attached frame 55 of the drill implement 45 pivots about the vertical axis defined by the hitch coupling pin 35. The hitch coupling member 130 is fixedly connected so as to rotate with the draw bar 30 of the tow vehicle 25. Rotation of the hitch coupling member 130 moves the drive linkage 135 in a generally longitudinal direction. Referring now to FIG. 2, the movement of the drive linkage 135 causes the steering linkage member 140 to rotate about the vertical axis defined by the coupling pin 325 with respect to the frame 55 of the drill implement 45. The hitch coupling member 130 thereby communicates a turn signal via the drive linkage 135 to the steering linkage member 140. In response to the turn signal, the steering linkage member 140 causes steering rod member 335 to laterally move in the general left and right turn direction of the tow vehicle 25 relative to the forward direction of travel 40. This lateral movement of the steering rod member 335 causes the steering arms 340, 342 of the attached the steering columns 100, 102 of the caster wheel assemblies 84, 86, respectively, to rotate in the turn direction of the tow vehicle 25 from the forward direction of travel 40. This rotation of the steering columns 100, 102 and tires 118, 120 of the center caster wheel assemblies 84, 86 complies to smoothly corner the drill implement 45 about the reference point A.

The desired response rate of the caster wheel assemblies 84, 86 in turning the tow vehicle 25 can be tailored to a greater or lesser amount by modifying the relative length of the drive linkage 135 and a distance ($d_2$) between the vertical axes defined by the coupling pins 35 and 160. In addition to enhancing the response rate for steering the drill implement 45, the steering connection assembly 20 also causes less or reduced side loading forces at the caster wheel assemblies 84, 86 of the drill implement 45. Also, the steering connection assembly 20 enhances the ability of the drill implement 45 to more closely follow the tow vehicle 25 and thereby be less prone to cut across corners, ditches, and gate posts.

A wide variety of implements could employ the steering connection assemblies 20, 174 and 228 constructed in accordance with the invention. Thus, while the invention is disclosed with reference to a drill implement 45 towed behind the tow vehicle 25, the invention is not so limited. One skilled in the art will recognize that the steering connection assemblies 20, 174 and 228 of the present invention can be employed to interconnect various types of towed implements connected to various types of tow vehicles and is not limiting on the invention.

Many changes and modifications could be made to the invention without departing from the spirit thereof. The scope of these changes will become apparent from the appended claims.

I claim:

1. A steering connection assembly that interconnects a detachable implement towed by a tow vehicle moving in a turn angle from a forward direction of travel, the tow vehicle including a drawbar, the detachable implement supported to move on at least one caster wheel assembly, the steering connection assembly comprising:
   a tow bar having a forward end opposite a rearward end, the forward end pivotally connected by a first pin at the drawbar of the tow vehicle so as to rotate about a first vertical axis defined the first pin, the rearward end fixedly attached at the frame of the agricultural implement;
   a drive linkage having a forward end pivotally connected by a second pin at the tow vehicle so as to rotate about a second vertical axis spaced from the first vertical axis;
   a steering linkage interconnecting the rearward end of the drive linkage member to the at least one caster wheel assembly, and
   a hitch coupling member interconnecting the drive linkage member to the drawbar of the tow vehicle; wherein the hitch coupling member includes a first leg and second leg to receive the drawbar therebetween;
   wherein the drive linkage communicates a turn signal representative of the turn angle of the tow vehicle to the steering linkage, and in response to the turn signal, the steering linkage steers the at least one caster wheel assembly in a direction toward the turn angle of the tow vehicle.

2. The steering connection assembly of claim 1, wherein the hitch coupling member includes a generally vertical aligned plate member perpendicular to a generally horizontal aligned plate member, wherein the vertical aligned member is attached at the drawbar of the tow vehicle, and wherein the horizontal member includes an opening therethrough configured to receive the second pin pivotally coupling the drive linkage at the hitch coupling member.

3. The steering connection assembly of claim 1, wherein the tow bar includes an A-frame structure fixed attached to move with the frame of the agricultural implement.

4. The steering connection assembly of claim 1, wherein the steering linkage is pivotally connected by a third pin at the frame of the agricultural implement so as to rotate about a third vertical axis defined by the third pin.

5. The steering connection assembly of claim 4, further comprising a steering arm fixedly attached to a steering column of the at least one caster wheel assembly so as to move with rotation of the at least one caster wheel assembly.

6. The steering connection assembly of claim 5, further comprising a steering rod member pivotally interconnecting each steering arm of the at least one caster wheel assembly to the steering linkage.

7. The steering connection assembly of claim 6, wherein the steering linkage is generally L-shaped and includes a first leg and a second leg each having a free end and defining a pivot point where they meet, wherein the pivot point defines the third vertical axis, and wherein one of the first and second legs is pivotally connected to the drive linkage and the other of the first and second legs is pivotally connected to the steering rod member.

8. An agricultural implement towed by a tow vehicle moving a turn angle from a forward direction of travel, the tow vehicle having a drawbar to be attached to the agricultural implement, comprising:
   at least one caster wheel assembly in support of a frame; and
   a steering connection assembly interconnecting the frame of the agricultural implement to the tow vehicle, the steering connection assembly including:
   a tow bar having a forward end pivotally connected by a first pin at the drawbar of the tow vehicle so as to rotate about a first vertical axis, and a rearward end fixed attached at the frame;
   a drive linkage having a forward end pivotally connected by a second pin to the drawbar tow of the vehicle so as to rotate about a second vertical axis spaced apart from the first vertical axis;
   a steering linkage interconnecting the rearward end of the drive linkage member to the at least one caster wheel assemblies, and
   a hitch coupling member interconnecting the drive linkage member at the drawbar of the tow vehicle;

wherein the hitch coupling member is keyed so as define a first leg and a second leg to receive the drawbar therebetween;

wherein in response to the turn angle of the tow vehicle from the forward direction of travel about the first vertical axis, the drive linkage communicates a turn signal to the steering linkage, and wherein in response to the signal, the steering linkage steers the at least one caster wheel assembly to turn in a direction of the turn angle of the tow vehicle.

9. The agricultural implement of claim 8, wherein the hitch coupling member includes a generally vertical aligned plate member perpendicular to a generally horizontal aligned plate member, wherein the vertical aligned plate member is attached at the drawbar of the tow vehicle, and wherein the horizontal aligned plate member includes an opening therethrough configured to receive the second pin pivotally coupling the hitch coupling member to the drive linkage about the second vertical axis.

10. The agricultural implement of claim 8, wherein the tow bar includes an A-frame structure fixed to move with the frame of the agricultural implement.

11. The agricultural implement of claim 8, wherein the steering linkage member is pivotally connected by a third pin at the frame of the agricultural implement so as to rotate about a third vertical axis defined by the third pin.

12. The agricultural implement of claim 11, further comprising a steering arm fixedly connected to the steering column of each of the at least one caster wheel assembly, the steering arm connected so as to move with rotation of the steering column of the respective at least one caster wheel assembly.

13. The agricultural implement of claim 12, further comprising a steering rod member pivotally interconnecting each steering arm to the steering linkage.

14. The agricultural implement of claim 13, wherein the steering linkage is generally L-shaped and includes a first leg and second leg each having a free end and defining a pivot point where they meet, wherein the third pin is located at the pivot point, and wherein the free end of one of the first and second legs is pivotally connected at the drive linkage and the free end of the other of the first and second legs is pivotally connected at the steering rod member.

15. A method of steering an agricultural implement towed behind a tow vehicle having a draw bar and hitch, the agricultural implement having a tow bar pivotally attached at the drawbar so as to rotate about a first vertical axis defined by a coupling pin interconnected therebetween, the method comprising:

turning the tow vehicle and drawbar a turn angle from a forward direction of travel;

turning a hitch coupling member fixed attached with the drawbar, the coupling member pivotally attached to a drive linkage so as to rotate about a second vertical axis spaced from the first vertical axis;

communicating a turn signal generated by the hitch coupling member via the drive linkage to a caster wheel assembly at the agricultural implement, the turn signal representative of the turn angle of the tow vehicle;

wherein the communicating step includes:

rotating a steering linkage pivotally attached by a third pin at a frame of the agricultural implement so as to rotate about a third vertical axis defined by the third pin; and moving a steering rod member in a lateral direction generally perpendicular to the central longitudinal axis of the implement, the steering rod member interconnected between the steering linkage and the caster wheel assembly, wherein moving of the steering arm in the lateral direction causes rotation of the caster wheel assembly in the direction of the turn angle of the tow vehicle; and steering the caster wheel assembly of the agricultural implement in a direction of the turn angle of the tow vehicle in response to the turn signal.

\* \* \* \* \*